United States Patent [19]

Goldfarb et al.

[11] 4,447,347
[45] May 8, 1984

[54] HEAT STORAGE SYSTEM

[75] Inventors: Louis Goldfarb, Lancaster; Clyde M. Sweigart, Landisville, both of Pa.

[73] Assignee: Armstrong World Industries, Inc., Lancaster, Pa.

[21] Appl. No.: 471,752

[22] Filed: Mar. 3, 1983

[51] Int. Cl.³ .............................................. C09K 3/18
[52] U.S. Cl. ....................................... 252/70; 106/13; 423/430; 423/635
[58] Field of Search .................. 252/70; 423/430, 635; 106/13

[56] References Cited

U.S. PATENT DOCUMENTS 4,389,323 6/1983 Gancy ................................... 252/70

FOREIGN PATENT DOCUMENTS 410004 9/1979 Sweden .

OTHER PUBLICATIONS

Carlsson, B. et al., "An Incongruent Heat-of-Fusion System–Calcium Chloride Hexahydrate–Made Congruent Through Modification of the Chemical Composition of the System", Solar Energy, 1979, 23(4), 343–350.

Primary Examiner—John E. Kittle
Assistant Examiner—Robert A. Wax

[57] ABSTRACT

A heat storage system which is comprised of calcium chloride hexahydrate as the storage medium and a nucleating agent, said nucleating agent being a mixture of dolomite and calcium hydroxide.

5 Claims, No Drawings

HEAT STORAGE SYSTEM

This invention relates to a heat storage system comprising calcium chloride hexahydrate ($CaCl_2$—$6H_2O$) and a dolomite-calcium hydroxide nucleating agent.

As the cost of energy continues to increase, the feasibility of storing energy (such as solar, off-peak electric and/or industrial-waste energy) increases. Suitable heat storage materials are, therefore, in demand.

Owing to its high heat capacity and its advantageous melting point (approximately 29° C.) calcium chloride hexahydrate is a very suitable heat storage material when used in conjunction with, for example, heat pumps, solar collectors, remote-heating installations and heat recovering installations.

However, this heat storage material has also the property that when cooled it supercools to a temperature considerably below the melting point (about 20° C.). In this case, it is not possible to withdraw the stored latent heat at the melting point. Without utilizing effective nucleating additives, the calcium chloride hexahydrate salt melt will definitely remain in a liquid state well below its freezing temperature.

It is known that supercooling of calcium chloride hexahydrate can be prevented by the addition of such nucleating agents as active aluminum oxide, molecular sieves, silica gel, mica powder, kaolin and/or infusorial earth (Chemical Abstracts 84 (1976) 108449b). These nucleating agents have the drawback, however, that the nucleation is not reliable and does not occur until after periods of time which may vary from several minutes to hours with supercooling temperatures varying over several degrees centigrade.

It has now been discovered that a nucleating agent which is comprised of a combination of dolomite ($CaCO_3 \cdot MgCO_3$) and calcium hydroxide will surprisingly promote the complete and rapid crystallization of calcium chloride hexahydrate to thereby result in a surprising efficient heat storage system. In addition, the heat storage system of the present invention is also advantageous in that it is low in toxicity. The heat storage system of the present invention is further advantageous in that it will work reversibly over many melting and freezing cycles.

The nucleating agent utilized in the present invention will preferably contain from about 0.2 to about 2.0 weight parts, and most preferably from about 0.5 to about 1.5 weight parts, of dolomite per one weight part of calcium hydroxide. In the heat storage system of the present invention, the nucleating agent will be present in a quantity of from about 0.4 to about 4.0 weight percent, and most preferably from about 1.0 to 3.0 weight percent, based on the total weight of the heat storage system.

In the heat storage system of the present system, the best results have been achieved using about 2 weight percent of a nucleating agent which is comprised of approximately equal weight parts of calcium hydroxide and dolomite.

EXAMPLE

The examples were conducted as follows:

Approximately 80 cm³ samples of $CaCl_2 \cdot 6H_2O$ and the specified nucleating agent were placed in sealed containers. The mixtures were melted in a hot water bath at 55° C. and maintained during a given melt at ±1° C. The observation of crystallite appearance was made visually. The induction time (defined as the time difference from immersion in the cold bath until the first appearance or crystallite) was recorded after each recrystallization. Generally speaking, shorter induction times are indicative of more effective nucleating agents.

EXAMPLE 1

This example utilized a nucleating agent which consisted of 1 wt. percent of dolomite and 1 wt. percent of calcium hydroxide and which was utilized according to the procedure set forth above. After each recrystallization, the storage salt (calcium chloride hexahydrate) and nucleating agent were reused in successive trials.

Using the above specified nucleating agent, the average induction time over 100 successive trials was 5.7 minutes.

COMPARATIVE EXAMPLE 1

This comparative example was conducted using procedures identical to those specified above, except that 1 wt. percent of calcium hydroxide alone was utilized as a nucleating agent. Over 100 successive trials the average induction time was 32 minutes.

COMPARATIVE EXAMPLES 2 TO 6

These comparative examples were conducted using procedures similar to those specified above, with the exception that the nucleating agent varied for each comparative example.

The following nucleating agents were utilized:

| Comparative Example No. | Nucleating Agent |
| --- | --- |
| 3 | 2 wt. % calcium hydroxide |
| 4 | 2 wt. % dolomite |
| 5 | 0.2 wt. % dolomite |

It was discovered that using 2 wt. percent calcium hydroxide as a nucleating agent produced results inferior to those achieved, as per Comparative Example 1, using 1 wt. percent calcium hydroxide.

The comparative examples (Numbers 4 and 5) that used dolomite above all exhibited little or no tendency to crystallize at times in excess of 200 hours.

The Example and the Comparative Examples surprisingly indicate that a nucleating agent that is comprised of a mixture of calcium hydroxide and dolomite is much more effective than nucleating agents that just contain either substance.

What is claimed is:

1. A heat storage system comprising calcium chloride hexahydrate as the storage medium and a dolomite-calcium hydroxide nucleating agent.

2. The heat storage system of claim 1 in which the nucleating agent is present in a quantity of from about 0.4 weight percent to about 4.0 weight percent, relative to the total weight of the heat storage system.

3. The heat storage system of claim 2 in which the nucleating agent is present of from about 1.0 weight percent to about 3.0 weight percent, relative to the total weight of the heat storage system.

4. The heat storage system of claim 1 wherein, in said nucleating agent, the ratio, by weight parts, of dolomite to calcium hydroxide ranges from about 0.2 to about 10.0 to 1.

5. A heat storage system comprising calcium chloride hexahydrate as the storage medium and a nucleating agent which is a mixture of about one weight percent of dolomite and one weight percent of calcium hydroxide, said weight percents being relative to the total weight of the heat storage system.

* * * * *